UNITED STATES PATENT OFFICE.

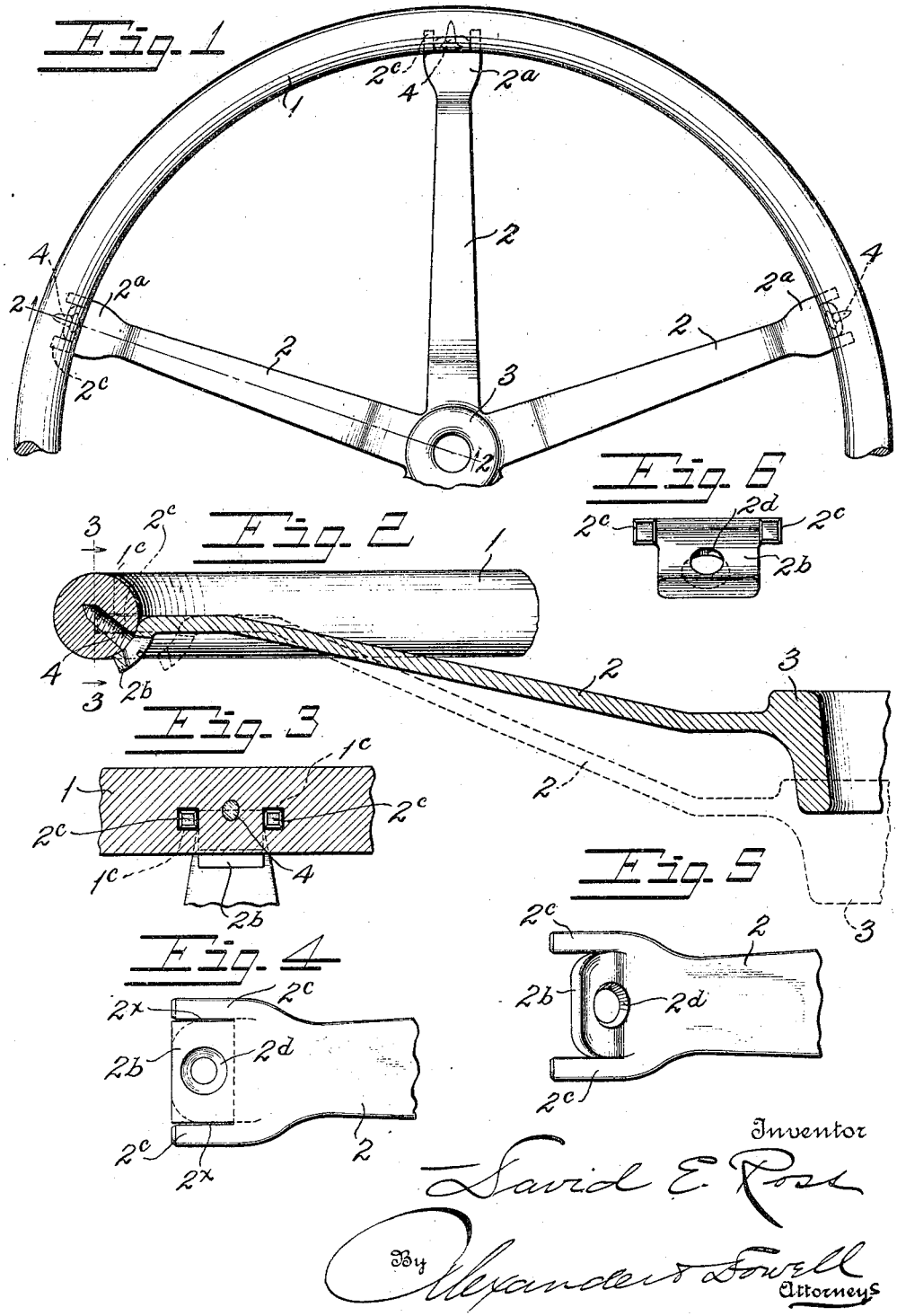

DAVID E. ROSS, OF LA FAYETTE, INDIANA, ASSIGNOR TO ROSS GEAR & TOOL COMPANY, OF LA FAYETTE, INDIANA, A CORPORATION OF INDIANA.

STEERING-WHEEL.

1,380,840.     Specification of Letters Patent.    Patented June 7, 1921.

Application filed February 9, 1920. Serial No. 357,323.

*To all whom it may concern:*

Be it known that I, DAVID E. Ross, a citizen of the United States, residing at La Fayette, in the county of Tippecanoe and State of Indiana, have invented certain new and useful Improvements in Steering-Wheels; and I hereby declare that the following is a full, clear, and exact description thereof, reference being had to the accompanying drawings, which form part of this specification.

This invention is a novel improvement in wheels or pulleys, and has particular reference to the steering wheels of automobiles.

The object of the invention is to provide novel connections between the spokes of the wheel and the rim thereof, whereby the spokes will be fastened to the rim in a most secure manner and the fastenings be capable of withstanding all the strains incident to the manipulation of the wheel in steering the vehicle under all conditions of operation without loosening or breaking.

I will first explain the invention with reference to the accompanying drawings, which illustrate one practical embodiment of the invention, and thereafter set forth in the claims the essentials of the invention and the novel features of construction, and novel combinations of parts for which protection is desired.

In said drawings:

Figure 1 is a view of part of a steering wheel, with the spokes connected to the rim in accordance with my invention.

Fig. 2 is an enlarged sectional view on the line 2—2, Fig. 1.

Fig. 3 is a detail sectional view on the line 3—3, Fig. 2.

Fig. 4 is a bottom plan view of the rim-engaging end of one of the spokes prior to bending same.

Fig. 5 is a similar view of the same spoke-end after bending it ready for engagement with the rim.

Fig. 6 is an outer end view of such spoke-end.

Heretofore steering wheels have been made with wooden or composition rims and metal centers composed of a hub and spokes, the spokes being ordinarily integral with or rigidly united to the hub portion of the center, and the outer ends of the spokes being connected with the rims in various ways. The rims are preferably made of wood veneer and are practically solid or without any joints.

The present invention is intended for use with such wooden rims, and in the drawing 1 indicates such a rim; 2 indicates the spokes, and 3 the hub of the rim center; the spokes and hub being preferably made integral, or rigidly united. The present invention has particular reference to the connection of the spokes with the rim and such spokes may be made of any suitable metal and pressed, wrought, or cast, of any desired cross sectional area.

Each spoke 2 preferably has its outer end slightly broadened as at $2^a$, and (when the spoke is pressed or stamped out) this end is slit longitudinally, on the lines $2^x$, Fig. 4, and the intermediate lip portion $2^b$ between these slits is bent downwardly, as shown in Figs. 2, 5 and 6, and curved to fit against the inner side and lower portion of the rim, as shown in Fig. 2, while the portions of the spoke end exterior to the lip $2^b$ project outwardly and form parallel dowels $2^c$; which dowels are adapted to enter and closely fit horizontally disposed parallel sockets $1^c$, bored in the rim 1, while the lip portion $2^b$ extends between and under sockets and fits closely against the under face and under side of the rim, as shown in Figs. 2 and 3.

The lip portion $2^b$ is or may be permanently secured to the rim by means of a wood screw 4, which is passed through a hole $2^d$ in the lip $2^b$, said hole preferably having its outer end countersunk for the reception of the head of said screw.

The spokes and hub may be united or formed integral with the spokes bent preferably so that their ends will be nearer the hub than when the center is united to the rim, as indicated in dotted lines in Fig. 2, each spoke having its outer end shaped as described. Then a rim 1 of the proper diameter is bored from the inside at the proper points to form the sockets $1^c$; and may also be bored at the proper points for the engagement of the screws 4. Then the rim center may be placed within the prepared rim (as indicated in dotted lines in Fig. 2) and the wheel center compressed facewise, so that the spokes are straightened out and their outer ends project farther away from the hub, and the dowels $2^c$ enter the sockets $1^c$ in the rim, and the compression is continued until the lip portions $2^b$ bear against the rim, as shown in Figs. 1 and 2; then the screws 4 are inserted in place.

When thus united to the rim each spoke has three points of engagement with the rim, to-wit—two dowel pins $2^c$ tightly engaging the sockets $1^c$; and a lip-portion $2^b$ fastened to the rim by the screw 4. The dowel pins provide a substantial connection between the rim and each spoke capable of resisting all vertical, horizontal, and rotatorial strains on the rim; and such strains are further resisted by the screws 4 and the lip-portions $2^b$ which further enable the rim to withstand distorting contracting strains; and the screws 4 and lip-portions $2^b$ resist distorting expansive strains on the rim.

The novel connections do not require the making of any weakening key slots in the rim, or the cutting of any large or longitudinal channels or slots in the rim for the engagement of enlarged spoke ends. The connections between the spoke and the rim are made in the simplest manner and without any injurious or useless cutting away or boring of the rim, or forming holes to be filled up after the rim is attached to the spokes. The complete wheel thus formed is strong, light, efficient and durable and the strength of the rim is maintained at the points where the rim is usually weakest in steering wheels as ordinarily constructed; and each spoke 2 is equally, strongly and securely connected with the rim in a manner to best resist all strains to which such wheels are subjected under the most severe working conditions.

While I have described the invention as particularly adapted for a steering wheel it is obvious that it might be used for connecting the spokes to the rims of other wheels or pulleys in a secure, efficient manner; and therefore I do not consider the invention restricted to steering wheels.

What I claim is:

1. In a wheel, a rim, and spokes having lips and dowels on their outer ends, the dowels being adapted to enter the rim and the lips to bear against the rim.

2. In a wheel, a rim; spokes having on their outer ends lips and dowels, the dowels being adapted to enter the rim and the lips to bear against the rim, and screws fastening the spoke-ends to the rim.

3. In a wheel; a rim having sockets; spokes having their outer ends provided with downwardly turned lips and dowels, the dowels being adapted to enter the related sockets in the rim and the lips to bear against the rim; and screws securing the lips to the rim.

4. In combination, a rim; a spoke having its outer end provided with a radially disposed dowel and a lip, the dowel being adapted to enter the rim; and a screw fastening the spoke end to the rim.

5. In combination with a rim having sockets; a spoke having its outer end provided with radially disposed dowels and a perforated lip, the dowels being adapted to enter the sockets in the rim, and the lip member engaging the rim; and a screw fastening the lip member to the rim.

6. In combination with a rim; a spoke having its outer end provided with radially disposed dowels and a downwardly curved perforated lip, the dowels being adapted to enter the rim; and a screw passing through the lip member and entering the rim at an angle to the dowel.

7. A spoke member having on its outer end two parallel dowels adapted to engage sockets in a rim member, and an intermediate downwardly curved lip portion adapted to fit against the inner side of the rim; the lip portion being perforated for the passage of a retaining screw.

8. A spoke member having its outer end provided with two parallel radially disposed dowels adapted to engage sockets in a rim member, and an intermediate downwardly curved lip portion, adapted to fit against the inner side of the rim, the lip portion being perforated for the passage of a retaining screw disposed at an angle to the dowel.

9. In a wheel the combination of a rim having pairs of sockets at spaced intervals; spoke members each having a pair of dowels on its outer end adapted to engage the sockets in the rim and a lip portion intermediate the pair of dowels adapted to engage the side of the rim, and a screw transfixing each lip portion and engaging the rim.

10. In a wheel the combination of a rim having pairs of sockets at spaced intervals; spoke members, each having a pair of dowels on its outer end adapted to engage the sockets in the rim and a downwardly turned lip portion intermediate the pairs of dowels adapted to engage the inner side of the rim between the sockets; and a screw transfixing each lip portion and engaging the rim between the sockets and at an angle to the dowels.

In testimony that I claim the foregoing as my own, I affix my signature.

DAVID E. ROSS.